United States Patent [19]

Dellis

[11] 4,336,688
[45] Jun. 29, 1982

[54] TURBOCHARGER CONTROL SYSTEM

[75] Inventor: Fred J. Dellis, Westbury, N.Y.

[73] Assignee: Windblown Systems, Inc., Amityville, N.Y.

[21] Appl. No.: 90,976

[22] Filed: Nov. 5, 1979

[51] Int. Cl.$^3$ ............................................. F02B 37/00
[52] U.S. Cl. .................................................... 60/602
[58] Field of Search ................ 60/600, 601, 602, 603

[56] References Cited

U.S. PATENT DOCUMENTS

| | | | |
|---|---|---|---|
| 2,373,139 | 4/1945 | Morris | 60/602 |
| 2,480,621 | 8/1949 | Warner | 60/602 |
| 3,270,951 | 9/1966 | Reed | 60/602 |
| 3,456,437 | 7/1969 | Rath et al. | 60/600 |
| 4,211,081 | 7/1980 | Yamada | 60/602 |

Primary Examiner—Michael Koczo, Jr.
Attorney, Agent, or Firm—Hopgood, Calimafde, Kalil, Blaustein & Judlowe

[57] ABSTRACT

An improved exhaust driven turbocharger control system using a preselected combination of exhaust and intake manifold pressures to effect a third pressure acting on the wastegate pneumatic control chamber which results in higher boost pressures at lower engine speeds with attenuated boost pressures as engine speeds increase.

4 Claims, 5 Drawing Figures

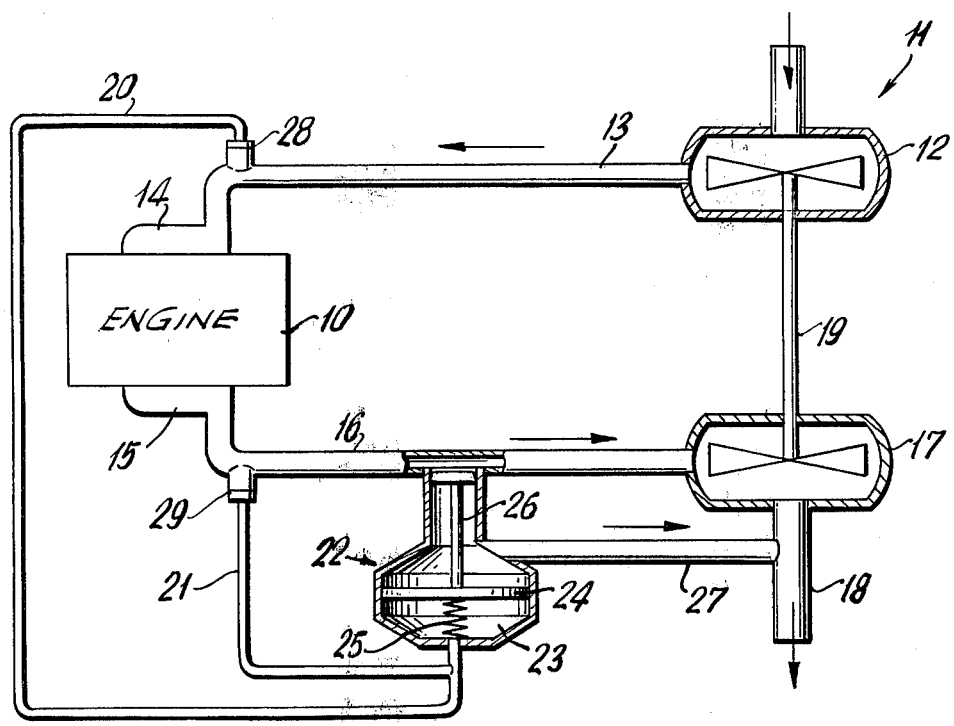
FIG.1
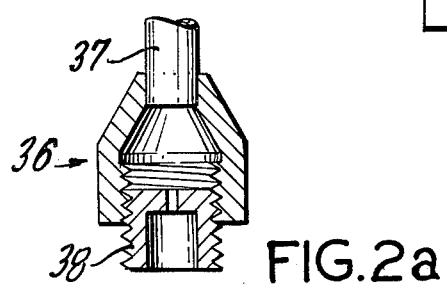
FIG.2
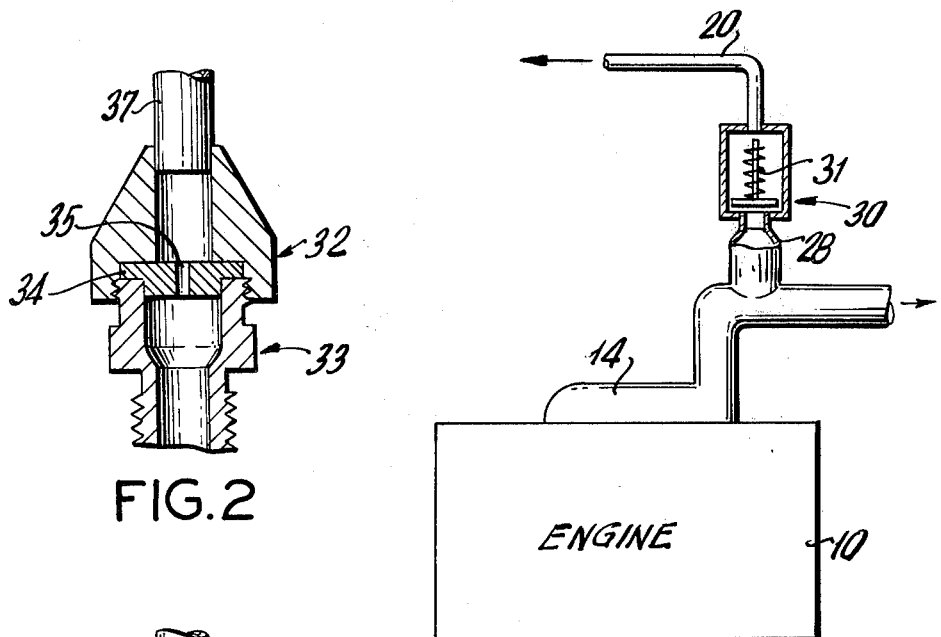
FIG.3
FIG.2a

TURBOCHARGER CONTROL SYSTEM

BACKGROUND AND SUMMARY OF THE INVENTION

The present invention relates to turbochargers used in conjunction with internal combustion engines and in particular to a control system for a turbocharger responding to intake and exhaust manifold pressure.

Normally, higher engine speeds result in higher turbocharger speeds with corresponding increases in compressor/intake manifold pressures. In addition, increasing the engine load at a constant engine speed results in increased exhaust gas temperature and increased gas flow thereby increasing turbocharger speed.

Since the limiting factor in turbocharging and internal combustion engine design is the maximum cylinder pressures that may be encountered, problems have resulted from the attempts to balance these maximum pressures with maximum design efficiency.

Pressure developed by a centrifugal turbocharger varies as the square of the speed. The exponential pressure increment that will render rapid boost at lower engine speeds will become a liability at higher speeds since it will inordinately raise cylinder pressures above design levels. In addition, excessive combustion chamber pressures and temperatures will increase the Nitrogen Oxide ($NO_x$) exhaust emissions above desireable levels.

In order to control cylinder pressures, various types of wastegates have been developed to limit the compressor/intake manifold boost pressure. This allows desireable boost at lower engine speeds with constant boost as engine speed increases. The limiting design factor, however, is still the combustion chamber pressure generated at the highest design speed of the engine. This limiting factor is due to the fact that cylinder pressure increases with engine speed.

One popular means by which engine manufacturers have dealt with the problem is to reduce the compression ratio of an engine when incorporating a turbocharger. This allows an increase in the boost pressure while the combustion chamber pressure remains at approximately the same level at the highest engine speed. This approach, of course, requires a redesigned engine with much of the same design limitations.

The most desirable turbocharged engine is one that can achieve maximum boost pressure and therefore torque at a lower engine speed with a corresponding decrease in boost pressure as engine speed increases to its maximum design speed. This arrangement eliminates the necessity to reduce the engine compression ratio while simultaneously maintaining engine life.

Another advantage is that the high torque corresponding to the higher compressor/intake boost pressures is not as important at high engine RPM as at low engine RPM since acceleration and torque are more desireable at lower engine speeds. This is particularly true in automotive applications when the automobile approaches highway access ramps and in passing situations.

It is the primary object of the present invention therefore to provide for an improved turbocharger control arrangement.

A further object of this invention is to limit the maximum engine combustion chamber pressure at high engine speed and thereby increase the life of the turbocharged engine.

A further object of the present invention is to employ the control unit as an additional Exhaust Gas Recirculating (EGR) mechanism by which part of the control system is used as an EGR when the intake manifold pressure is less than than the exhaust manifold pressure.

A further object of the present invention is to allow turbochargers to be incorporated into internal combustion engines without changes in the original compression ratio of the engine and to maintain the combustion chamber pressure at high engine speeds at a value that does not exceed that of a redesigned engine with a lower compression ratio.

Another object of the present invention is to minimize cylinder detonation when using less than optimum octane fuels.

Still other objects of the invention will become apparent upon a reading of the detailed specifications to follow.

BRIEF DESCRIPTION OF THE DRAWINGS

In order to better understand the invention reference is made to the following drawings:

FIG. 1 is a diagrammatic illustration of the turbocharger control system and method of invention showing the wastegate in longitudinal cross-section.

FIGS. 2 and 2a are longitudinal cross-sections of orifice control devices in first and second embodiments respectively.

FIG. 3 is a diagrammatic illustration of the turbocharger control system and method of the invention showing an alternate embodiment having a check valve in the pneumatic intake control conduit.

DESCRIPTION OF THE PREFERRED EMBODIMENTS

Figure 4:
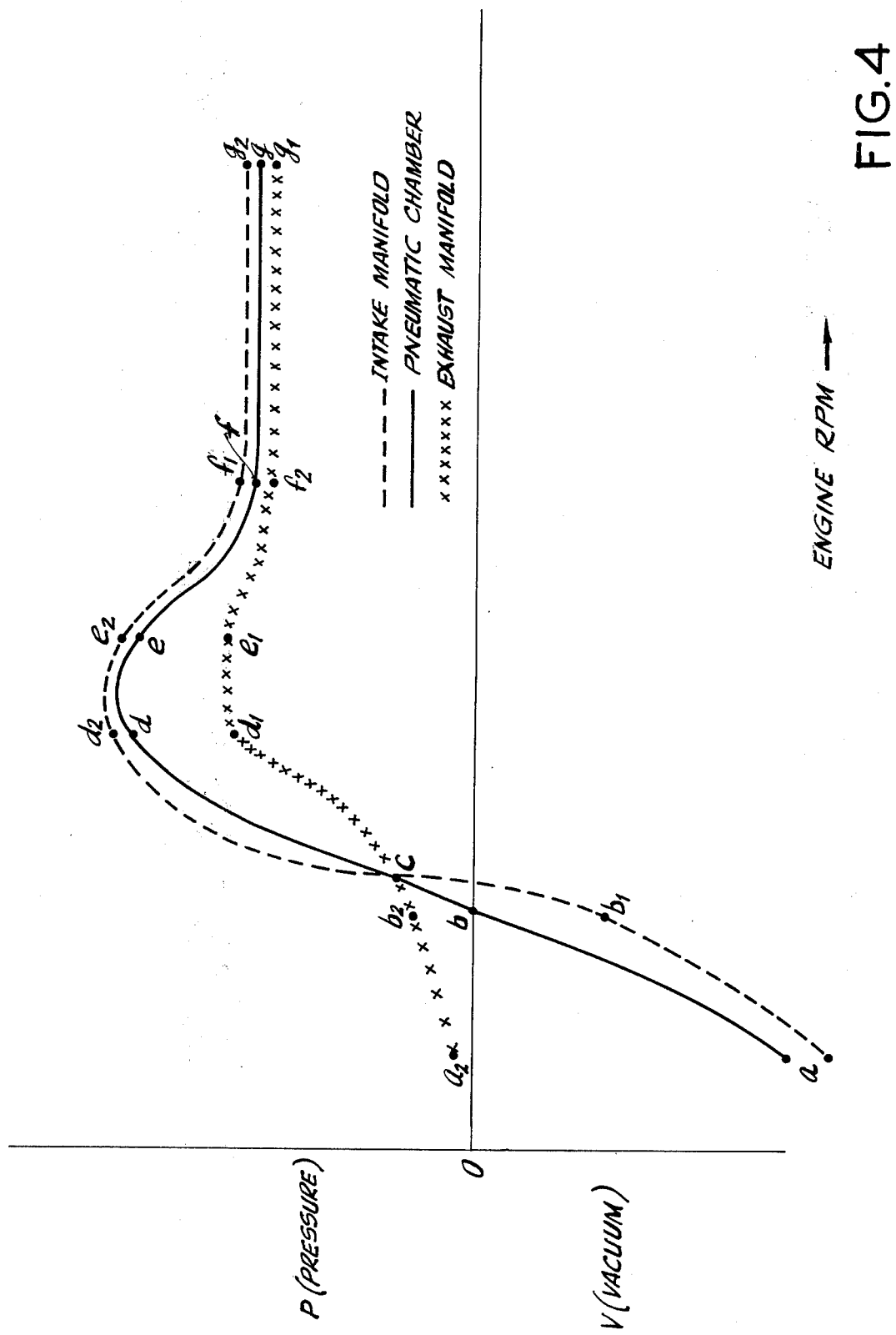
FIG. 4 shows a typical boost pressure curve when embodying the present invention in a turbocharged internal combustion engine.

The turbocharger control system of the present invention may be employed in carbureted, fuel injected, diesel and other type engines with FIG. 1 diagrammatically illustrating the control arrangement in an engine of conventional configuration.

An engine 10 is fitted with a turbocharger 11 having a compressor rotor 12 for pressurizing gas flow to an intake manifold 14 through a conduit 13. Exhaust gas flow from engine 10 passes from an exhaust manifold 15 through a conduit 16 to a turbine impeller 17. Turbine 17 acts as a power supply to compressor 12 by means of a shaft 19 connecting for rotation turbine 17 and compressor 12. After exiting turbine impeller 17 the exhaust gas passes through exhaust pipe 18 to a conventional muffler system and the atmosphere.

The apparatus provided to control the turbocharger operating and manifold pressure consists of a conventional wastegate 22 including a diaphragm 24 separating a pneumatic chamber 23 from a wastegate valve 26 and containing a wastegate spring 25. The control system includes a pneumatic intake control conduit 20 connecting intake manifold 14 through an intake orifice control 28 to wastegate pneumatic chamber 23. In direct communication at all times with pneumatic intake control conduit 20 is an exhaust pneumatic control conduit 21 connecting exhaust manifold 15 through exhaust orifice control 29 to wastegate pneumatic chamber 23. A suitable line for conduits 20 and 21 is tubing having a 5/32 of an inch outside diameter with an inner diameter of approximately ⅛ inch.

Thus, the pressure in chamber 23 is a combination of the intake and exhaust manifold pressure. Spring 25 is selected so that at a preselected pressure within pneumatic chamber 23, the pressure will overcome the tension of spring 25 which will permit valve 26 to move upwardly to open to permit the exhaust gas to bypass turbine 17 through bypass conduit 27 thus controlling the maximum speed and maximum boost supplied by the turbocharger. When the pressure in exhaust control conduit 21 exceeds that in intake control conduit 20 the exhaust gas will be recirculated into intake manifold 14.

Referring to FIG. 2, shown therein is the basic orifice controls 28 and 29 as utilized in the intake and exhaust control systems. Orifice controls 28, 29 may be designed for a specific engine and manifold design taking into consideration pneumatic velocities and pressures indigenous to that design and may include a flow control module 37, comprised of a first part 32 and a second part 33 mounting an insert or disc 34 which has one or more apertures 35 to allow pneumatic intake or exhaust pressures to be transmitted over a specific time frame to obtain an optimized characteristic curve as shown in FIG. 4. The orifice assembly can take the form as shown in FIG. 2A where disc 34 and first part 32 are incorporated into a single unit 36 or any other form that a person skilled and familiar in the art may apply. Orifice Body 38 of FIG. 2A replaces the second part 33 in FIG. 2. The apertures used in orifice controls 28, 29 are of the order of 0.020 to 0.060 inches, and are varied to suit the needs of the particular engine. The orifice controls 28, 29 impart a delay into the transmission of the pressure readings to pneumatic chamber 23.

It should be noted that the poppet type wastegate spring 25 is preselected according to the specific curve and boost value desired at various engine speeds as well as preselected orifice 35 sizes to deliver the appropriate boost values and boost curve over a specific time frame and RPM speed. Thus by preselecting appropriate orifice sizes and spring values the exact amount of boost required and the precise boost curve can be provided to optimize the performance of the engine.

In addition, boost value and boost introduction will vary according to to engine load which is related to the gearing of the transmission. In lower gears, the engine load is lower than at higher gears resulting in lower exhaust temperatures and exhaust volume. Boost, under these conditions, is introduced at slightly higher engine speeds than at higher gears. Because of the higher temperatures with higher gears and engine loads, boost pressure will be slightly higher and will remain at that value over a shorter engine RPM span.

Boost pressure, therefore, will vary in direct proportion to engine load and in inverse proportion to transmission gearing ratios. Also, engine RPM spread between positive boost and attenuated higher RPM boost decreases as engine load increases. Since higher torque values are desireable at lower engine RPM, engine or vehicle acceleration is very rapid. However, the higher combustion chamber pressure generated thereby is in effect over only a minimal time span and thus, the generated heat is dissipated almost immediately with no harmful effects on engine components.

FIG. 4 is a pressure versus engine speed diagram for exhaust manifold 15, intake manifold 14 and wastegate pneumatic chamber 23. Points a represent the beginning of the curves in which the exhaust manifold pressure exceeds that of the intake manifold and the intake manifold is operating in a state of vacuum. Point b is the point at which the pneumatic chamber pressure becomes positive. Point c is the point at which the three curves cross the pressures of the intake manifold, exhaust manifold and pneumatic chamber are equal. Between points a to c the exhaust gas will be recirculated into the intake because the exhaust manifold pressure exceeds the pressure of intake manifold. Points d represent the pressures found when the wastegate opens to stablize the exhaust pressure at level d1. From point d2 it is seen that the intake manifold pressure level continues to rise because of the momentum of the turbine and compressor and the orifice restrictions placed in the control line. Points e show the points where the momentum of the turbine and compressor begin to decrease and accordingly the intake, exhaust and pneumatic chamber pressures begin to decrease. Point f represents the point at which the pneumatic chamber pressure levels off to the average of the exhaust and intake manifold pressures with the wastegate valve in the opened position. Points g show the pressures at maximum engine speed.

The boost curve as shown in FIG. 4 is typical of full throttle acceleration. Under partial throttle, maximum boost values decrease with decreased throttle and the typical curve becomes flatter with lower boost over the complete engine RPM range. It is apparent that due to the presence of orifice controls 28 and 29 and the momentum effects described above, the pressure in chamber 23 is not necessarily the algebraic sum of the intake and exhaust manifold pressure. Accordingly, the curve can be varied at will through the means herein described.

If it is deemed desireable to generate an extremely high boost (d) over a short engine RPM range with a substantially lower high RPM boost (f-g), the rotating mass of the turbine and compressor wheels should be increased so that the inertial forces generate an extra boost when the wastegate opens followed by a sharp drop off in boost pressure after the desired peak. This may also be accomplished by suitable modifications to orifice controls 28 and 29.

FIG. 3 shows an alternate embodiment where intake orifice control 28 is combined with a check valve 30 that prohibits a vacuum signal from intake manifold 14 from combining with the exhaust control signal from exhaust manifold 15 and being introduced to wastegate pneumatic chamber 23. In this mode, the wastegate pneumatic chamber control pressure will build up more rapidly with the rate being influenced by the exhaust and intake control orifice selection thereby actuating the turbine 17 at a lower engine speed. Check valve spring 31 selection can be varied according to the desired boost curves and wastegate valve spring pressure selection. In this fashion, more precise variations can be effected.

In summary, it is apparent that the invention provides a method of turbocharger control where the intake manifold boost is selected by intake and exhaust manifold control signals in open communication at all times and combined into a third signal acting on a wastegate with a pneumatic chamber controlling a wastegate valve. By preselecting specific intake and exhaust orifice sizes combined with wastegate valve spring selection, a specific boost curve can be generated which is responsive to both intake and exhaust pressures where maximum boost is generated at a lower engine RPM where higher torque is desireable with a progressive rate of boost pressure decrease as engine RPM increases. This turbocharger control system also allows a smooth transition from one engine operational mode to another by taking into account the time factors in the control signal pressure. These basic forces are designed to be in effect over a specific time frame taking advantage of momentary pressure gradients and inertial forces.

It should also be noted that while fluidic controls have been described above, other controls such as electronic sensors electronically coupled to an electronically controlled wastegate may also be used. When electronic controls are used a suitable electronic time delay may be utilized instead of the orifice controls used in the present fluidic coupling.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. In an internal combustion engine having an intake manifold, an exhaust manifold and an exhaust driven turbocharger for compressing the intake charge, said turbocharger including a wastegate for limiting the boost pressure to a predetermined value, a pneumatic chamber for controlling said wastegate, the improvement comprising:
   a first control line coupled for fluid communication between said intake manifold and said pneumatic chamber of said wastegate;
   a second control line coupled for fluid communication between said exhaust manifold and said pneumatic chamber of said wastegate;
   said first control line communicating the pressure within said intake manifold to said pneumatic chamber, said second control line communicating the pressure within said exhaust manifold to said pneumatic chamber;
   said first and second control lines being constructed and arranged so as to be capable of fluid communication with each other to thereby effect a third pressure acting on said pneumatic chamber to thereby control said wastegate.

2. The combination of claim 1 wherein at least one of said first and second control lines contains orifice means.

3. The combination of claim 1 wherein said first control line contains check valve means to prevent communication of a vacuum in said intake manifold.

4. The combination of claim 2 wherein said orifice means includes a selectively replaceable disc having at least one aperture therein.

* * * * *